United States Patent
Walter et al.

(12)

(10) Patent No.: US 6,234,903 B1
(45) Date of Patent: May 22, 2001

(54) SHAFT COUPLING WITH COOLING ELEMENTS

(75) Inventors: Jürgen Walter, Haltern; Ulrich Falz, Dortmund, both of (DE)

(73) Assignee: Hackforth GmbH & Co. KG, Herne (DE)

(*) Notice: Subject to any disclaimer, the term of this patent is extended or adjusted under 35 U.S.C. 154(b) by 0 days.

(21) Appl. No.: 09/355,877

(22) PCT Filed: Jan. 29, 1998

(86) PCT No.: PCT/EP98/00464

§ 371 Date: Sep. 27, 1999

§ 102(e) Date: Sep. 27, 1999

(87) PCT Pub. No.: WO98/34039

PCT Pub. Date: Aug. 6, 1998

(30) Foreign Application Priority Data

Feb. 4, 1997 (DE) .............................. 197 03 936

(51) Int. Cl.⁷ .................. F16D 3/56; F16D 3/76
(52) U.S. Cl. .................. 464/17; 403/220; 464/96
(58) Field of Search .................. 464/17, 87, 92, 464/98, 99, 903; 403/220, 228, 225

(56) References Cited

U.S. PATENT DOCUMENTS 3,988,907  11/1976  Bohm et al. .

FOREIGN PATENT DOCUMENTS

| 37 10 390 | 10/1988 | (DE) . |
| 2035341 | 12/1970 | (FR) . |
| 2613006 | 9/1988 | (FR) . |

*Primary Examiner*—Lynne H. Browne
*Assistant Examiner*—Kenn Thompson
(74) *Attorney, Agent, or Firm*—Collard & Roe, P.C.

(57) ABSTRACT

A shaft coupling (1) has at least one elastic torque transmission element (4) in a single piece to which connecting elements (3) are fixed at the driving and driven sides. In order to increase the stressability due to the thermal stresses on the elastic transmission elements (4) and thus to ensure higher power densities with smaller volumes, at least one cooling element (6) made of a good heat-conducting material is non-detachably embedded in the transmission element (4). The cooling element (6) extends through a core zone of maximum heat generation and through a relatively cooler outer zone of the transmission element (4).

17 Claims, 1 Drawing Sheet

SHAFT COUPLING WITH COOLING ELEMENTS

The invention relates to a shaft coupling with at least one single-piece elastic transmission element for transmitting the torque, to which connecting elements are fixed on the driving and the driven sides.

Such couplings, which are typically arranged in the drivetrain between the engine and the transmission for transmitting the torque, are known in the state of the art by a multitude of different designs. Said designs, which may considerably deviate from each other in some cases with respect to their concrete technical embodiment, have the common feature that the torque is transmitted between the drive and the driven elements exclusively via elastically deformable transmission elements such as, for example rubber elements. For mounting between the halves of the coupling, such rubber elements are, as a rule, provided on both sides with metallic connection elements such as connection flanges or the like.

In addition to transmitting a mean driving torque, one of the important functions of such an elastic shaft coupling is to decouple the drivetrain from damaging torque peaks of the driving motor. Such variations in the torque are caused, for example by rotational vibrations, which are stimulated especially in the crankshafts of large low-inertia mass diesel engines. The elastic transmission elements are designed with respect to their elasticity and damping effect in such a way that they absorb said dynamic disturbances for the most part, so that the torque is provided with an even curve on the driven side.

A basic problem arises from the fact that the dynamic stresses described above are converted into heat when the elastic element is flexed, which may lead to local overheating because the employed elastomer materials such as, for example rubber have a distinctly low thermal conductivity. If the permissible limit temperature of the elastic material is exceeded due to such thermal load, damages occur that load to premature wear of the coupling.

Controlling the thermal problems in the face of increasing torques is made more difficult in light of the fact that the ratio of thermal stressability to mechanical stressability becomes more and more unfavorable as the dimensions of the elastic transmission element increase. The danger of local thermal overloads and of damage resulting therefrom exists especially in the core regions.

In order to achieve higher thermal stressability, it has already been proposed in DE 3710390 C2 to provide the elastic rubber elements including the connecting plates with through-extending windows, with the window openings extending through the core regions that were earlier subjected to the highest thermal stress. The rubber element is additionally cooled by the air circulating through the openings, so that the coupling overall can be stressed to a higher degree.

The solution described above does in fact offer distinct advantages versus single-piece solid rubber elements, however, it, too, is restricted by limit values conditioned by the principle, because the cross section of the window openings cannot be provided with any desired size, as this would reduce by the same measure the cross section of the elastic element, which absorbs the total dynamic load. For this reason, any further enlargement of the windows beyond the optimal size would again lead to reduced strassability.

However, even if the windows are designed in the optimal way, it was found that small core zones, or so-called heat foci, remain nonetheless. Such core zones are in fact shifted in terms of location as compared to the solid designs, and they do appear only in the presence of higher stresses; however, they nonetheless mark a limit which, if exceeded, leads again to damage.

A basic problem arises from the fact that there is a tendency in the direction of higher and even higher power densities combined with a structural volume as small as possible, but that it is not possible with the measures known according to the prior art to increase the stressability of couplings because of the thermal stress acting on the elastic transmission elements.

For solving said problem, the invention proposes for a shaft coupling of the type specified above that at least one cooling element made of a material with good thermal conductivity is nondetachably embedded in the transmission element, whereby such cooling element extends through a core zone of maximum heat generation and through a relatively cooler outer zone of the transmission element.

The cooling element as defined by the invention is an elastically deformable element consisting of a material with good thermal conductivity, i.e., which at least has a better thermal conductivity than the material of the elastic transmission element, e.g. rubber. According to the invention, said cooling element is arranged in the transmission element in such a way that it forms a heat bridge between the core zones in which maximum thermal stress occurs due to high dynamic loads, i.e., in the heat foci and in the outer zones of the transmission element, which are by nature cooler due to the dissipation of heat to the outside.

The special advantage of the invention results from the fact that owing to the arrangement of the cooling element, or cooling elements or heat conductors, the heat is dissipated from the critical zones into cooler zones in a targeted manner. In this connection, the mechanical and thermal properties of the cooling element may be adapted to the elastic material of the transmission element in such a way that no substantial change occurs in the elastic transmission properties of the coupling, i.e., that no undesirable weakening or hardening will occur. This can be accomplished in that the cooling element is elastically deformable to such an extent that it is capable of following the deformation of the transmission element.

Due to the fact that the cooling element overall provides for a more uniform temperature distribution within the elastic element, i.e., that fewer temperature gradients occur, the thermal wear, which rises overproportionately with the temperature, is significantly reduced, and the useful life of the transmission elements is thus distinctly prolonged.

The transmission elements designed as defined by the invention basically may be elements made of any desired material. However, according to the state of the art, particularly efficient transmission elements are known, which consist of a vulcanized rubber element to which metallic connecting elements are attached by vulcanizing. Such rubber elements are known, for example from the above-cited document DE 3710390 C2, and are characterized in general by special reliability. According to the invention, the cooling element is preferably vulcanized into the rubber as well, which ensures a safe support and good heat transfer from the heat foci.

According to an advantageous embodiment, provision is made that the cooling element is a cooling metal sheet with bending elasticity. It is preferably a thin metal sheet with good thermal conductivity which can be well-integrated in the transmission elemt with respect to its mechanical properties and dimensions.

According to an alternative embodiment, provision is made that the cooling element has a multitude of thermally conductive fibers. This may be either a flat or three-dimensional bundle of heat-conducting fibers arranged in parallel, or of thermally donductive fingers, for example wires, bands, flat sections, bars or the like, or also lamellae aligned like a comb, as well as also mats, net-like structures or the like. Such designs offer the advantage that they are mechanically particularly flexible.

Provision is made according to advantageous further developments of the invention that one side edge of the cooling element ends flush with the surface of the transmission element, i.e., that it terminates flush on said surface, or projects outwardly beyond the surface. In this way, it is accomplished that the heat withdrawn by the cooling element from the core zone is directly dissipated into the environment, resulting in a particularly efficient cooling action.

If a cooling metal sheet is employed as the cooling element, the latter should preferably consist of high-strength spring steel, because a thin spring steel sheet exhibits particular bending elasticity and has good thermal conductivity. At the same time, the strength is adequately high even with little thickness of the material in order to withstand the sometimes relatively high inner forces in the transmission element.

According to another advantageous further development of the invention, the cooling metal sheet is provided with at least one breakthrough. For example, if the cooling metal sheet is perforated with a great number of apertures, this will result in a particularly intimate connection with the material of the elastic element, for example when it is vulcanized into the rubber element. The breakthroughs have a further function if the elastic transmission element is provided with through-extending windows, whereby said breakthroughs correspond with said cooling windows with respect to shape and size, so that they dissipate the heat also into the air flowing through said windows.

All known types of design of elastic transmission elements basically can be created as defined by the invention for realizing the advantages described above. The transmission element may be also a torsional element, in connection with which the torque is introduced via axial connecting plates or flanges, or can be designed also as a rotational thrust element, which substantially has the form of a cylindrical ring, and to which the torque is admitted via the inner and outer radial surfaces.

If a cooling metal sheet is employed as the cooling element, its shape and arrangement is in each case usefully coordinated with the type and form of the elastic transmission element, so that primarily bending stresses of the metal sheet occur when such transmission element is deformed. Based on these considerations it is advantageous of the cooling metal sheet employed in connection with torsional elements is disposed in an axial plane with respect to the axis of the coupling, i.e., if it has substantially the form of a flat ring disk. On the other hand, in connection with rotational thrust elements, it is appropriate if the cooling metal sheet is disposed on a cylinder surface coaxial relative to the axis of the coupling, i.e., if it bent cylindrically.

The instruction according to the invention can be just as well advantageously applied both to elastic shaft couplings having one single one-piece transmission element, and shaft couplings where a multitude of segment-shaped transmission elements are installed, such elements being successively arranged in the circumferential direction and each being made as one piece. The cooling element as defined by the invention, for example a cooling metal sheet, is radially segmented in this connection as well.

For the purpose of optimizing the dissipation of heat from the elastic transmission element, it may be advantageous if the latter is additionally provided with through-extending cooling windows extending through both the connecting elements and the elastic element disposed in between. Such a combination results in a particularly advantageous synergetic increase in the cooling effect.

According to another further development of the invention, which offers benefits especially in view of the operational safety, provision is made that the transmission element has safety means gripping around the cooling element without contacting it. Such safety means are anchors or claws, which are either anchored in the body of the cooling element, or which grip around its connecting elements, and which radially embrace the cooling element. An additional safety feature is obtained in this way in the event the transmission element, for example because of extreme overstressing, detaches itself from the material of the elastic transmission element, and threatens to tear out radially outwardly because of the centrifugal force. In such emergency cases, the transmission element is radially caught by the safety means and prevented from exiting from the transmission element outwardly and causing damage or injury.

According to an advantageous embodiment of the safety means, provision is made that said means have retaining anchors gripping through the cooling element. Such retaining means may be, for example pins arranged in the cooling windows.

Exemplified embodiments of the invention are explained in the following with the help of drawings, in which:

FIG. 1 shows an axial view of shaft coupling 1 shown by one half, said coupling being formed by ¼th segments 2.

The individual segments 2 have axial connecting flanges 3 as connecting elements on the driving and driven sides, which are usually made of steel, and which are provided over their circumferences with a multitude of flange boreholes.

Figure 1:
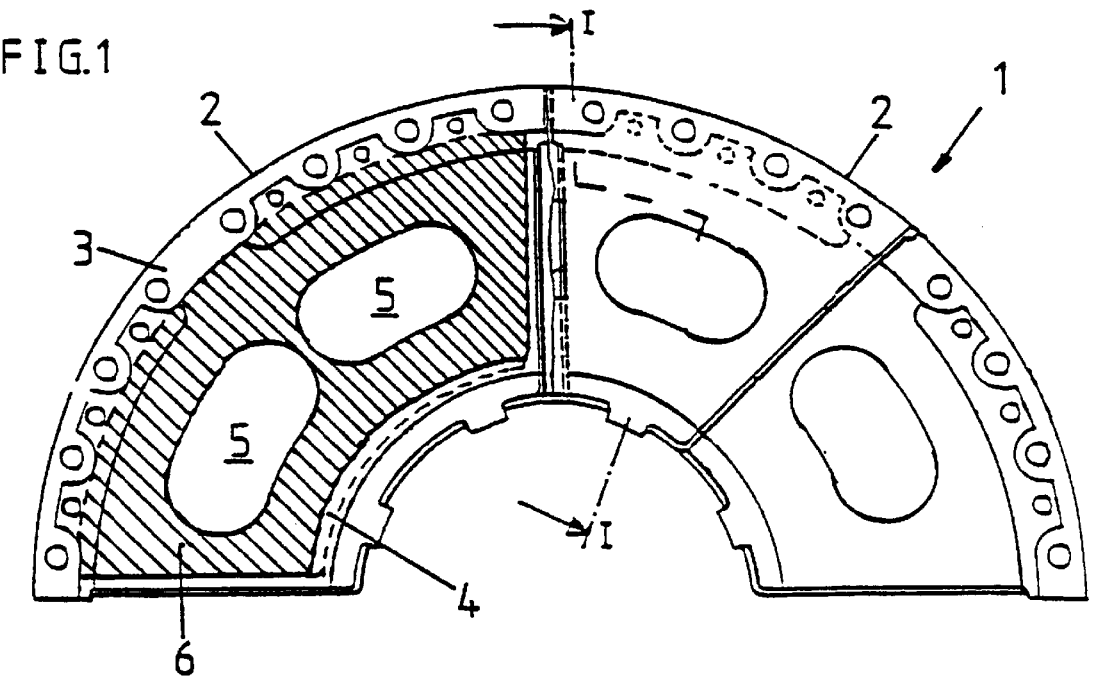
FIG. 1 shows a shaft coupling with segmented transmission elements represented by a partially axial view.

Torsional elements designed in the form of rubber elements 4 are incorporated by vulcanization as elastic transmission elements between the connecting flanges 3, said torsional elements being segmented as well. The dimensions of such a rubber element 4 are indicated in FIG. 1 in segment 2 shown at the left by a dashed bordering.

Both the connecting flanges 3 and the rubber elements 4 are provided with axially through-extending cooling windows 5.

In segment 2 shown at the left, a cooling metal sheet 6 as defined by the invention is drawn in the form of a shading. Said cooling metal sheet consists of high-strength spring steel sheet having a thickness of, for example 2 to 3 mm, and is vulcanized into rubber element 4. It is disposed substantially flat or slightly curved like the jacket of a cone in an axial plane in rubber element 4, whereby the arrangement is selected in accordance with the instruction of the invention is such a way that it intersects the heat foci occuring between the cooling windows and the outer zones.

Cooling metal sheet 6 is dimensioned in such a way that its inner edge starts radially with a spacing from the inner jacket surface of rubber element 4, i.e., its inner edge is completely embedded in the rubber. With its edge, cooling metal sheet 6 ends flush with the outer jacket surface of rubber element 4. Like the rubber element, it is penetrated by the cooling windows 5 as well.

Figure 2:
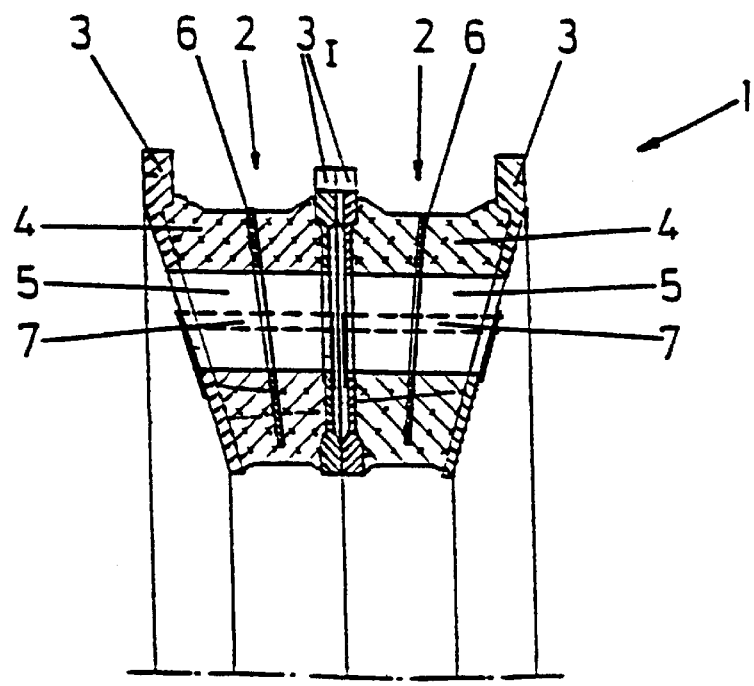
FIG. 2 is a sectional representation along section I—I according to FIG. 1.

The arrangement of the individual structural components is particularly clearly shown in FIG. 2, which shows a radial section through shaft coupling 1 along line I—I according to FIG. 1, whereby identical reference numerals are used. Said representation shows that in such shaft couplings 1, two coupling components formed by the same type of segments are usually flanged together in the flow of the torque, i.e., axially one after the other.

The arrangement of rubber elements 4 having an approximately V-shaped cross section, and having the connecting flanges 3 attached to them by vulcanization on both sides, can be seen in this representation with particular clarity. Furthermore, said representation also shows the floating support of the cooling metal sheets 6 as defined by the invention, which are vulcanized into the rubber elements 4. In the present connection, "floating support" means that cooling metal sheets 6 are held in rubber elements 4 only by the forces of adhesion that come to bear due to the vulcanized embedding.

In said representation, the outer edges of the cooling metal sheets 6 terminate flush with the outer jacket surfaces of rubber elements 4. However, it is conceivable also that the cooling metal sheets 6 project outwardly and/or inwardly beyond the circumference of rubber elements 4 in order to permit even better dissipation of heat, if need be.

The shape of the cooling metal sheets 6 as defined by the invention is basically adapted in each case to the shape of the rubber elements 4 in such a way that said cooling metal sheets, when stressed by torsion as a result of torque variations, are only subjected to a bending stress, which can be absorbed without problems, for example by highly elastic spring steel sheet. With all of that, the thickness of of the sheet material is selected in such a way that cooling metal sheet 6 remains elastic and will not lead to any undesirable stiffening of the rubber element 4, whereby very high forces would occur on the interfaces between the cooling sheet and the rubber, among other things, that could promote detachment.

As safety devices that prevent the cooling metal sheets 6 from tearing out of the rubber elements 4, FIG. 2 shows, furthermore, the safety bolts 7 which, in the normal case, extend contactless through the cooling windows 5, and which are solidly connected with the connecting flanges. In the event a cooling metal sheet 6 gets detached and threatens to fly radially outwardly due to the centrifugal force, it is radially retained by the safety bolts 7.

The arrangement of cooling metal sheets 6 as defined by the invention, or also of fiber-like cooling fingers or cooling lamellae made of material with good thermal conductivity is principally not restricted to the rubber elements 4 shown, which are designed as torsional elements. Said cooling sheets or other types of elements can just as well vulcanized into rotational thrust elements, where the torque is induced or conducted away via the inner or outer jacket surface.

According to the instruction as defined by the invention, when the cooling metal sheets 6 are designed with respect to their form and dimensions and their arrangement in the rubber elements 4, it is only necessary to take into account that the cooling elements lead through the zones of maximum heat generation, the so-called heat foci, and form a heat bridge for dissipating the loss heat into cooler zones or into the outside air.

By virtue of the embodiment as defined by the invention, a lower temperature and a flatter temperature gradient are obtained in the interior of the rubber element 4, which correspondingly prolongs the useful life of the rubber elements 4.

What is claimed is:

1. An elastic shaft coupling with at least one one-piece elastic transmission element for transmitting the torque, to which connecting elements are fixed on the driving and driven sides, characterized in that at least one cooling element (6) consisting of material with good thermal conductivity is nondetachably embedded in the transmission element (4), whereby the cooling element (6) extends through a core zone of maximum heat generation and a relatively cooler outer zone of the transmission element (4).

2. The shaft coupling according to claim 1, characterized in that the transmission element consists of a vulcanized rubber element (4), to which metallic connecting elements (3) are vulcanized, and into which the cooling element (6) is vulcanized.

3. The shaft coupling according to claim 1, characterized in that the cooling element (6) is a cooling metal sheet with bending elasticity.

4. The shaft coupling according to claim 1, characterized in that the cooling element (6) has a multitude of thermally conductive fibers.

5. The shaft coupling according to claim 1, characterized in that one side edge of the cooling element (6) terminates with the surface of the transmission element (4).

6. The shaft coupling according to claim 1, characterized in that the cooling element (6) projects beyond the surface of the transmission element (4).

7. The shaft coupling according to claim 3, characterized in that the cooling metal sheet (6) consists of high-strength spring steel.

8. The shaft coupling according to claim 3, characterized in that the cooling metal sheet (6) is provided with at least one breakthrough (5).

9. The shaft coupling according to claim 3, characterized in that the cooling metal sheet (6) is disposed in an axial plane with respect to the axis of the coupling.

10. The shaft coupling according to claim 3, characterized in that the cooling metal sheet (6) is disposed on a cylinder surface coaxial with the axis of the coupling.

11. The shaft coupling according to claim 9, characterized in that the cooling metal sheet (6) is radially segmented.

12. The shaft coupling according to claim 1, characterized in that the transmission element (4) is a torsional element.

13. The shaft coupling according to claim 1, characterized in that the transmission element (4) is a rotational thrust element.

14. The shaft coupling according to claim 1, characterized in that it has a plurality of single-piece, segment-shaped transmission elements (4).

15. The shaft coupling according to claim 1, characterized in that the transmission element (4) has a through-extending window (5).

16. The shaft coupling according to claim 1, characterized in that the transmission element (4) has safety means (7) gripping around the cooling element (6) without contacting the latter.

17. The shaft coupling according to claim 16, characterized in that the safety means have retaining anchors (7) gripping through the cooling element (6).

* * * * *